United States Patent [19]

Weatherston

[11] E Re. 29,627

[45] Reissued May 9, 1978

[54] ROTARY COMPRESSOR

[75] Inventor: Roger C. Weatherston, Amherst, N.Y.

[73] Assignee: Calspan Corporation, Buffalo, N.Y.

[21] Appl. No.: 684,813

[22] Filed: May 10, 1976

Related U.S. Patent Documents

Reissue of:

[64] Patent No.: 3,844,695
Issued: Oct. 29, 1974
Appl. No.: 441,929
Filed: Feb. 12, 1974

U.S. Applications:

[63] Continuation of Ser. No. 297,576, Oct. 13, 1972, abandoned, and Ser. No. 76,519, Sep. 29, 1970, abandoned.

[51] Int. Cl.[2] ..... F01C 1/14; F01C 1/18; F04C 17/10; F04C 23/00

[52] U.S. Cl. ..... 418/9; 418/180; 418/191; 418/206

[58] Field of Search ..... 418/9, 180, 191, 199, 418/200, 205, 206

[56] References Cited

U.S. PATENT DOCUMENTS

| | | | |
|---|---|---|---|
| Re. 25,567 | 5/1964 | Lorenz | 418/9 |
| 541,684 | 6/1895 | Rinehart et al. | 418/9 |
| 2,097,037 | 10/1937 | Northey | 418/206 |
| 2,360,833 | 10/1944 | Hammond | 418/206 |
| 2,386,318 | 10/1945 | Jensen | 418/206 |
| 2,454,048 | 11/1948 | Flanagan | 418/206 |
| 3,105,634 | 10/1963 | Hubrich | 418/206 |
| 3,121,529 | 2/1964 | Hubrich | 418/180 |
| 3,121,530 | 2/1964 | Lorenz | 418/206 |
| 3,263,911 | 8/1966 | Hubrich | 418/196 |

FOREIGN PATENT DOCUMENTS

| | | | |
|---|---|---|---|
| 660,528 | 2/1929 | France | 418/9 |
| 1,243,816 | 7/1967 | Germany | 418/9 |

*Primary Examiner*—John J. Vrablik
*Attorney, Agent, or Firm*—Allen J. Jaffe

[57] ABSTRACT

A rotary compressor having mating rotary impellers defined by lobes and well spaces therebetween, a discharge port sealed by the peripheral surface of one of the lobes and passages for communicating one impeller well space with a well space of the other impeller as the discharge port is sealed by the one impeller peripheral surface. According to one form, the passages are defined by conduits in the compressor housing; whereas according to a second form the passages are defined by a recess in one impeller and the interior of the compressor housing.

18 Claims, 14 Drawing Figures

ROTARY COMPRESSOR

Matter enclosed in heavy brackets [ ] appears in the original patent but forms no part of this reissue specification; matter printed in italics indicates the additions made by reissue.

This is a continuation of application Ser. No. 297,576 filed Oct. 13, 1972 now abandoned and application Ser. No. 76,519 filed Sept. 29, 1970, now abandoned.

BACKGROUND OF THE INVENTION

The present invention relates to improved rotary compressors and, more particularly to compressors of the Root's type which are suitable for efficient operation at relatively high compression ratios.

The conventional lobe or Root's-type blower or compressor has been traditionally employed in high capacity-low pressure applications. At high compression ratios, over two for example, the efficiency of the compression process decreases rapidly. The reason for a low efficiency of compression in the conventional Root's-type device is due to the fact that the inlet charge of fresh gas that is captured in the lobe well or pocket is not compressed until the pocket is exposed to the high pressure discharge region. Upon such exposure to discharge pressure, the low pressure within the pocket becomes pressurized by a [block-back] *blow-back* of gas from the discharge region. This blow-back of gas loads or pressurizes the impeller, causing all the input shaft work on the fresh gas to be done against the discharge pressure level. This is to be contrasted with an efficient isentropic compression process wherein the work is done as the pressure of the fresh gas is built-up gradually from the inlet pressure to the discharge pressure. In this manner, the average pressure against which work must be done is considerably less than that of the discharge.

SUMMARY OF THE INVENTION

The foregoing disadvantages, as well as other, of conventional Root's-type compressors are overcome according to the present invention which provides a Root's-type compressor suitable for efficient compression at relatively high compression ratios.

As used herein the term "precompression" refers to an increase in pressure that is brought about by a reduction in volume of the gas trapped between counter rotating impellers, it is the type of compression experienced in a reciprocating piston type of compressor. This is to be contrasted with the compression that is achieved by the rapid backflow of gas from the discharge region as is characterized by the conventional Root's-type compressor. Thus, the precompression of the present invention is brought about by impeller rotation and not by backflow of gas at discharge pressure. This significance of the distinction is that while the pressure of the fresh charge of gas is being built up, the pressure loading, against which the impellers do work, is less than the final discharge pressure level, resulting in a work saving unloading of the impellers during each cycle. To accomplish precompression in a Root's-type compressor, it is necessary that there be some means of either eliminating or partially restricting the backflow of high pressure in large gas.

In one aspect of the invention the precompression is accomplished by the provision of structure when cyclically seals off the discharge port which coacts with passage means which provides communication between the pocket or well volume of one impeller with the pocket volume of the other impeller before either of the volumes become exposed to the discharge or outlet passage. The structure which provides the sealing off of the discharge port may be the peripheral surface of one of the impellers.

In one form of the invention the passage means may comprise conduits in the compressor housing or externally thereof, whereas in a second form the passage means may be defined by at least a portion of the peripheral surface of each impeller and the working chamber interior walls and located substantially out of the plane of the discharge port.

In a second aspect of the present invention wherein the gear well volumes of each impeller are separately discharged the backflow of gas from the discharge is restricted by a very close and coordinated action of a second compressor stage. According to this embodiment about half of the fresh gas charge from each well volume of the first stage is captured by one impeller well volume in the second stage at a pressure level equal to about twice the fresh gas intake pressure of the first stage. The remaining half of each fresh gas charge from the well volume is permitted to backflow into one low pressure well of the first stage for the next cycle. This action raises the pressure in the first stage to a level about midway between the intake and final discharge pressure. Thus, the first stage impellers are about one-half unloaded with respect to the final discharge pressure level. According to this aspect of the present invention a third and fourth stage may be provided wherein the impellers of which are mounted on the first and second stage shafts, respectively; providing a compact, efficient and economical arrangement.

Other objects and advantages of the present invention not specifically mentioned hereinabove will become apparent as the detailed discussion of the same proceeds.

BRIEF DESCRIPTION OF THE DRAWINGS

For a fuller understanding of the present invention, references should now be had to the following detailed description taken in conjunction with the accompanying drawings, wherein.

DESCRIPTION OF THE PREFERRED EMBODIMENTS

Figure 1:
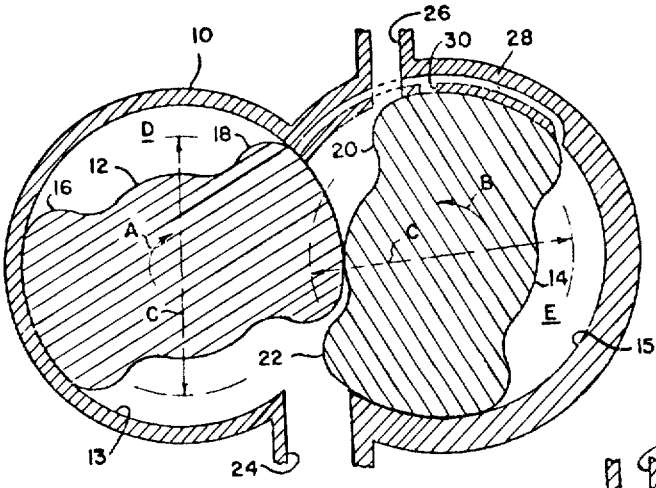
FIG. 1 is a schematic cross-sectional view of *an* embodiment of a rotary compressor according to the present invention.
Figure 2:
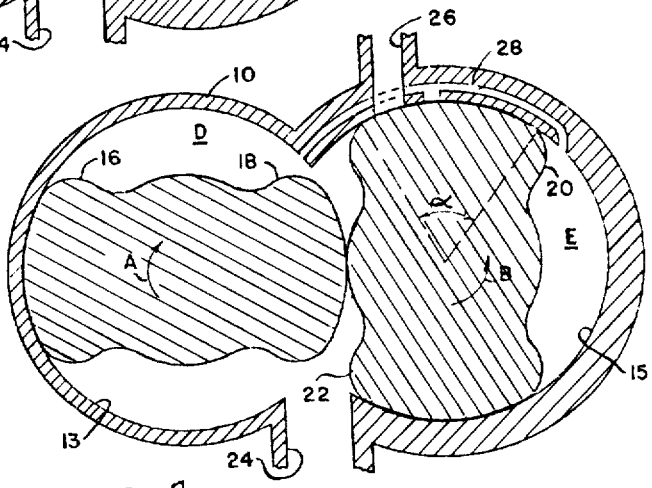
FIG. 2 is a sectional view similar to FIG. 1 illustrating the impellers in a second rotational position.

Referring now to the drawings and, more particularly, to the embodiment illustrated in FIGS. 1–4, the compressor casing or housing is schematically depicted at 10 and has rotatably supported therein a pair of working members in the form of coacting impellers 12 and 14, which are driven by suitable conventional driving and timing gears (not illustrated). Impeller 12 is supported in cylindrical working chamber 13 for clockwise rotation in the direction of arrow A and impeller 14 is supported in cylindrical working chamber 15 for opposed counterclockwise rotation in the direction of arrow B. As illustrated impeller 12 has two lobes 16 and 18 and impeller 14 has two lobes 20 and 22. Since rotary devices are basically leak type mechanisms it is important to achieve maximum displacement per unit depth of impeller. To this end, each impeller profile may contain about the same radial depth both inside of and outside of the path circle, as is conventional on a Root's-type machanism. In FIG. 1, the pitch diameter is depicted by the dashed line c.

Casing 10 has a gas inlet 24 which may be a slot, as illustrated, or a series of ports extending substantially the depth of the impellers. Inlet 24 is about equally spaced from the axis of each impeller. Communicating with the chamber 15 interiorly of casing 10 is a gas discharge port 26, the axis of which is offset with respect to the axis of inlet 24; being closer to the axis of impeller 14. The arrangement is such that the peripheral surfaces of lobes 20 and 22 function to substantially seal the outlet 26 during part of their rotational cycle, as will be discussed in greater detail hereinbelow.

In the position illustrated in FIG. 1 the high pressure gas between the impellers 12 and 14 has just been discharged through conduit 26 and fresh charges of gas are captured in the closed well volumes between lobes 16 and 18 and 20 and 22, depicted as volumes D and E, respectively. Casing 10 contains an arcuate conduit 28 which is adapted to place volume D in communication with volume E as soon as discharge port 26 is sealed by the lobes of impeller 14. To facilitate the delivery of gas in volume D after the discharge port 26 is reopened a branch passage 30 is provided extending from conduit 28 to chamber 15. Conduit 28, which is depicted internally of casing 10, could obviously be located externally thereof and out of the plane of discharge port 26.

Figure 3:
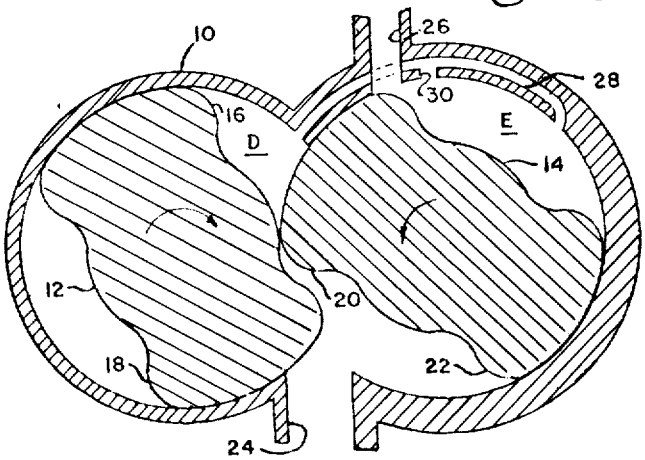
FIG. 3 is similar to FIG. 1 illustrating the impellers in a third rotational position.
Figure 4:
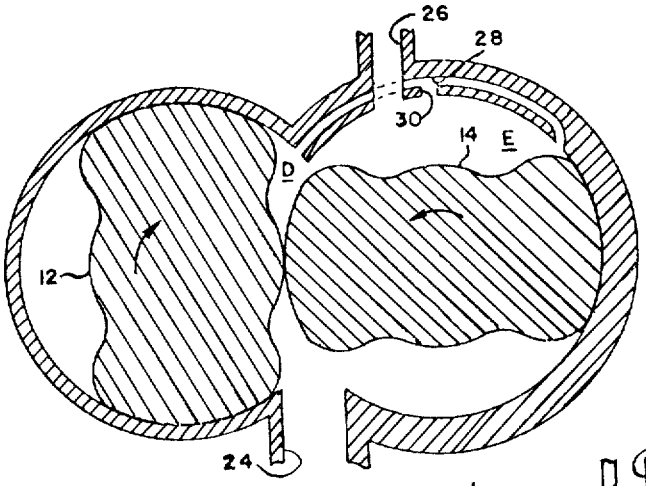
FIG. 4 is similar to FIG. 1 illustrating the impellers in a fourth rotational position.

The operation of the FIG. 1 embodiment will be discussed with reference to FIGS. 1–4. In the position of the impellers shown in FIG. 1, the constant pressure delivery process is nearing an end and the peripheral surface of lobe 20 is closing off the discharge port 26. There remains between the two impellers and in conduit 28 some residual gas at high pressure after the discharge is closed. When the impellers move to the position shown in FIG. 2, this residual gas expands into well volume D and into well volume E via conduit 28. Well volumes D and E, which were at the intake pressure level before exposure to the residual gas, now have their pressure levels raised somewhat due to the exposure. In addition, the high pressure acting against the forward face of lobe 20 is now substantially unloaded. As the impellers rotate further from the position illustrated in FIG. 2 toward the position illustrated in FIG. 3 gas is transferred from well volume D to well volume E via passage 28. Since volume D is diminishing while volume E remains constant and discharge port 26 is not yet open, the gas undergoes a substantial precompression before it is discharged to the outlet pressure level. In FIG. 3 the discharge passage 26 has just been exposed and the gas in volume E is discharged. It is to be noted that branch passage 30 is now open to accommodate the continued transfer of gas from volume D to volume E, thence to discharge port 26, until the volume D is open to volume E as shown in FIG. 4. From which position the discharge continues until the impellers assume the position of FIG. 1 to repeat the cycle.

Since the peripheral surface of lobe 20 or 22 functions as a valving member to seal discharge 26, it should be apparent that the amount of precompression in volume E is governed by the extent of these surfaces. Although as illustrated in FIGS. 1—4 the extent of the peripheral surface at constant radius of each lobe is about 65° (angle $\alpha$ in FIG. 2) it has been found that for a compression ratio of at least 2, a mimimum of 45° is desirable.

Figure 5:
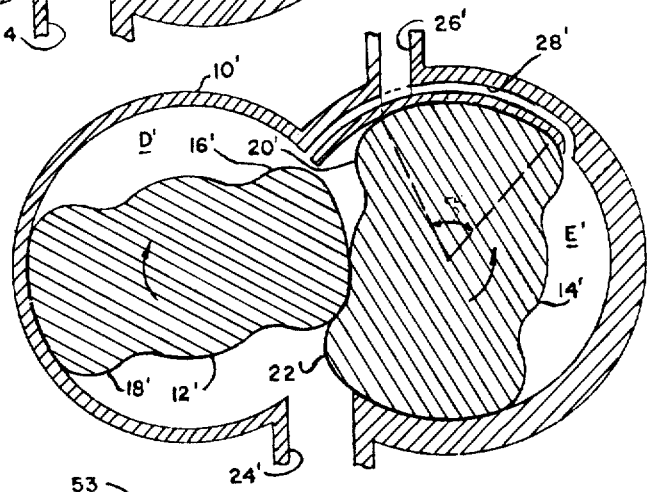
FIG. 5 is a schematic cross-sectional view illustrating a slight modification of the FIG. 1 compressor.

If higher compression ratios are desired, it is advantageous to increase the extent of the precompression build-up prior to discharge. This means that the discharge port must be closed a greater percentage of the cycle time. The embodiment of FIG. 5 illustrates modified structure to produce such a higher compression ratio. In this embodiment like numerals with the addition of primes refer to parts which are similar to the like numbered parts in the FIGS. 1–4 embodiment.

In FIG. 5, the extent of the peripheral surfaces of lobes 20′ and 22′ of impeller 14′ has been increased such that discharge port 26′ is sealed thereby a greater proportion of the cycle time than was the case in the FIG. 1 embodiment. To accommodate this increase in lobe profile at the outer radius and the reduced inner radius profile of impeller 14′, impeller 12′ is changed accordingly such that lobes 16′ and 18′ thereof mate smoothly with the volumes between lobes 20′ and 22′. As shown in FIG. 5 the arc length (angle $\alpha'$) of the peripheral lobe surface 20′ is about 95°. It therefore should be clear that the volume E′ between lobes 20′ and 22′ has much more time to increase its pressure. For compression ratios of over 3 the angle $\alpha'$ for each lobe should be a minimum of [$\alpha$°] *60°*.

Figure 6:
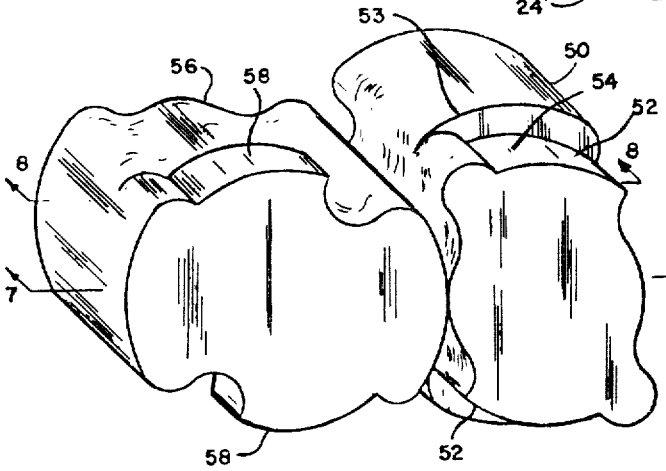
FIG. 6 is a pictorial representation of the coacting impellers of a modification.

FIGS. 6 through 9 illustrate a still further modification for achieving gas precompression in the basic Root's type apparatus. Whereas in the embodiments previously described the means for achieving precompression took the form of passage means in the blower casing, in the FIGS. 6 through 9 embodiment the passage means is defined by a recess in one impeller and the interior wall of the casing out of the plane of the discharge port. Thus, as shown in FIG. 6 the impellers 50 and 56 are generally similar to the impellers 12 and 14 of the FIG. 1 embodiment except for [and] an outer recessed portion 52 on impeller 50 and a coacting projecting surface 58 on impeller 56. As illustrated recessed portion 52 is located at one end of the impeller and extending from the outermost peripheral curved surfaces 53 thereof inwardly to an arcuate surface 54. Surface 58 is an outer curved surface which projects between lobes 57 and which compliments the recesses 52 of impeller 50.

Figure 7:
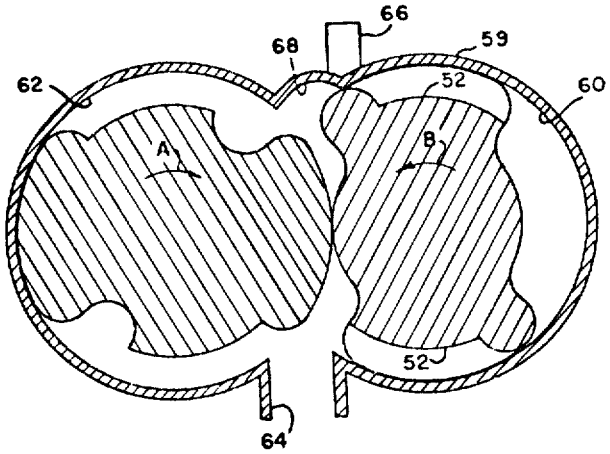
FIG. 7 is a sectional view taken along line 7—7 of FIG. 6 with the impeller casing added.
Figure 8:
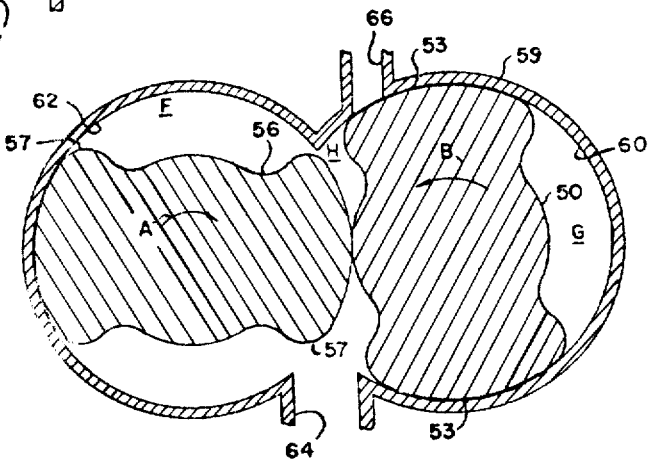
FIG. 8 is a sectional view taken along line 8—8 of FIG. 6.
Figure 9:
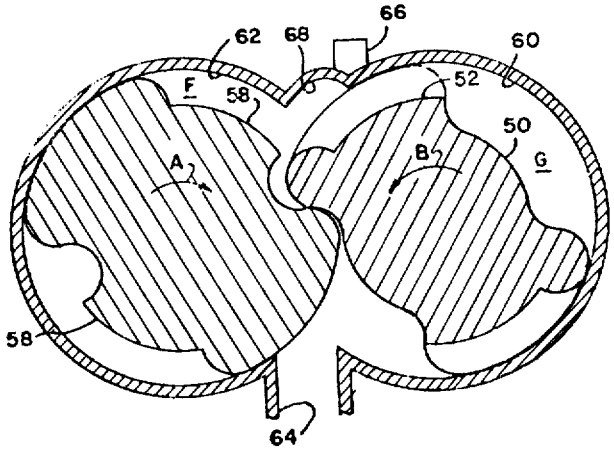
FIG. 9 is a view similar to FIG. 7 illustrating the impellers in a different rotational position.

As shown in FIGS. 7-9 the impellers 50 and 56 are mounted for rotation in the direction of arrows A and B in the housing 59 which defines generally cylindrical working chambers 60 and 62. An inlet 64 communicates with chambers 60 and 62 and an offset output 66 directly communicates only with chamber 60. The outlet 66 lies out of the plane containing the coacting recesses and projections 52 and 58, respectively, such that the outlet is sealed by the outermost surface 53 of impeller 50 as illustrated in FIG. 8.

In the position shown in FIGS. 7 and 8, the discharge to outlet 66 has just been completed and the outlet is substantially sealed by surface 53 of impeller 50. Further rotation of the impellers establishes communication between well volume F defined by impeller 56 and working chamber 62 and well volume G defined by impeller 50 and working chamber 60. As shown in FIG. 9 this communication is established by the recess 52 while the outlet 66 is sealed. As in the previous embodiments, the gas in well volumes G and F is precompressed as the impellers rotate towards each other before port 66 is exposed. When port 66 is exposed, the discharge process will begin until port 66 is again closed by the outermost surface 53 of impeller 50. To rapidly relieve the residual pressure that is built up between the impellers at volume H (FIG. 8), immediately after discharge port 66 is closed the housing 59 may have a protruding portion 68 intermediate the discharge port and the chamber 62 which provides a passage for the residual gas to expand into well volume F and into well volume G via recess 52. As a result, the pressure against which the impellers must work is relieved as soon as the discharge process is complete which thereby maximizes the efficiency of the compressor.

FIGS. 10 through 14 illustrate a multi-staged embodiment incorporating means for attaining precompression. A four stage compact housing 100 is interiorly divided by means of partitions 102, 104, 106 and 108 into four sets of chambers, depicted generally as 110, 112, 114 and 116 which function respectively as first, second, third and fourth stages of the compressor. An inlet 118 communicates with the first stage chambers 110. A second stage outlet 120 is adapted for communication with a third stage inlet 122 as indicated schematically at 124. A fourth stage outlet is provided at 126 for supplying fluid to a point of use.

Figure 10:
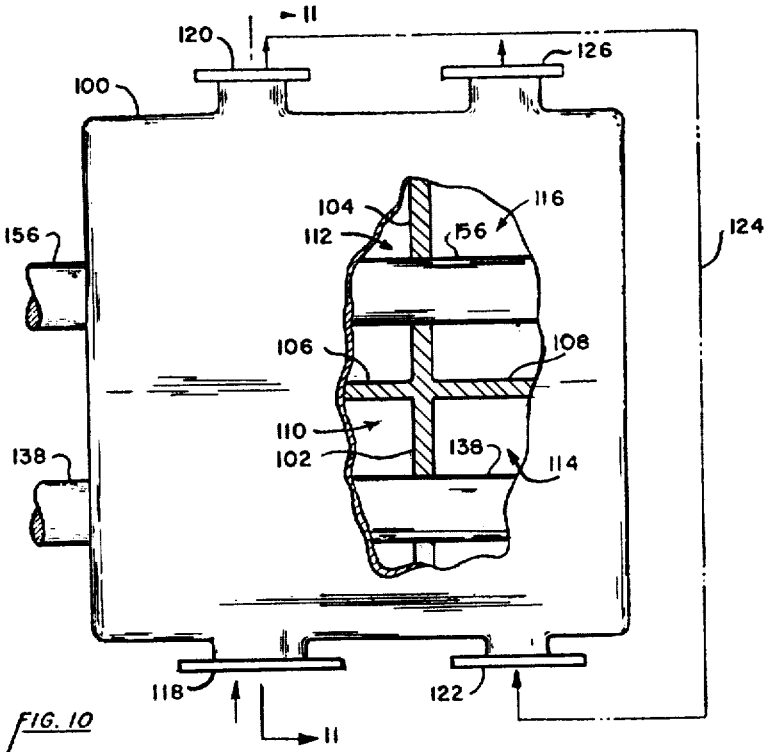
FIG. 10 is an elevational view with parts broken away of a modification illustrating a four stage compressor arrangement according to the invention.
Figure 11:
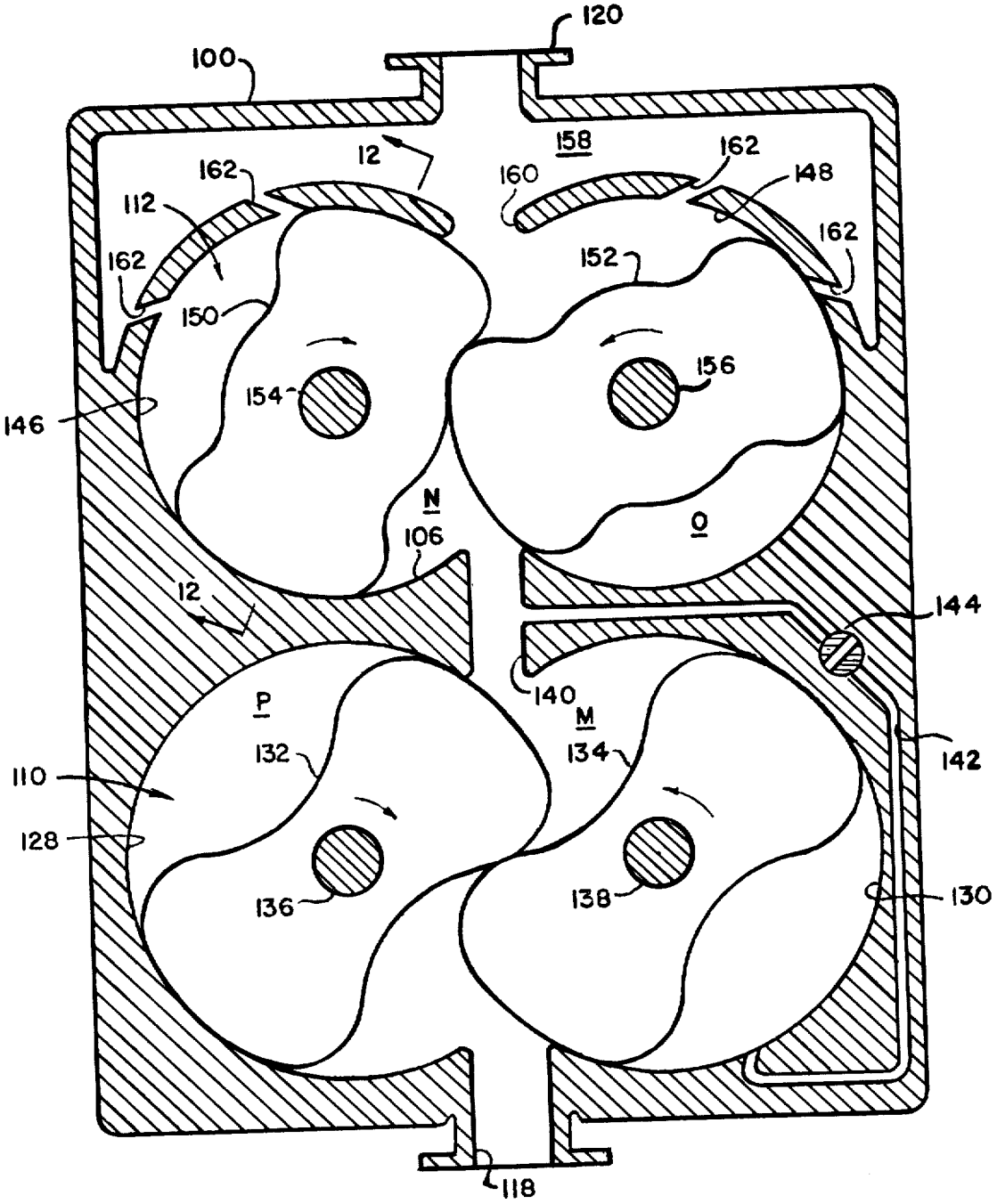
FIG. 11 is a sectional view taken along line 11—11 of FIG. 10.

FIG. 11 illustrates a cross-sectional view of the first and second stages; it is to be understood that since the cross-sectional view of the third and fourth stages is similar, these stages are not separately illustrated. The first stage 110 comprises a pair of generally cylindrical working chambers 128 and 130, in which are respectively mounted mating two-lobed impellers 132 and 134. Impellers 132 and 134 are mounted for rotation with respective drive shafts 136 and 138, which shafts, as partially shown in FIG. 10, are common to the mating impellers of the third stage 114. Thus, one of the impellers of the third stage is keyed to shaft 136 whereas the other impeller of the third stage is keyed to shaft 138.

A short internal passage 140 in partition 106 provides communication between the outlet of the first stage with the inlet of the second stage. A similar passage (not illustrated) in partition 108 provides communication between the third and fourth stages. A by-pass or capacity turndown passage 142 branches from passage 140 and communicates with the inlet pressure region of working chamber 130 as illustrated. As illustrated the termination of line 142 is directed against the back side of impeller 134 to augment its motion. This makes use of the turndown gas rather than completely wasting it by allowing it to dump back to the first stage inlet 118. A suitable valve 144 is provided in passage 140 for controlling the flow therethrough.

Figure 12:
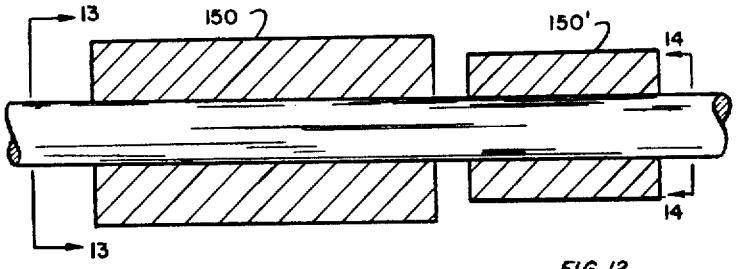
FIG. 12 is a fragmentary sectional view taken along line 12—12 of FIG. 11.

The second stage 112 comprises a pair of generally cylindrical working chambers 146 and 148, in which are respectively mounting mating two lobed impellers 150 and 152. Impellers 150 and 152 are mounted for rotation with respective drive shafts 154 and 156, which shafts as partially shown in FIG. 10 are common to the mating impellers of the fourth stage 116. Thus, as shown in FIG. 12 impeller 150 is keyed to shaft 154 which also carries impeller 150' of the fourth stage. In a like manner, not illustrated the other impeller of the fourth stage is mounted on shaft 156 which also carries the other impeller 152 of the second stage.

An outlet region 158 is provided between the second stage working chambers 112 and the second stage outlet 120; an opening 160 at the joinder of the chambers 146 and 148 provides communication between the working chambers and the outlet region 158. A plurality of feedback passages 162 provide additional communication between outlet region 158 and the working chamber interiors. Similar structure (not illustrated) is to be found in the fourth stage.

Shafts 136, 138, 154 and 156 are driven by suitable timing and synchronizing, gears to maintain constant the angular relationship between the impellers of the first and second stage in the relative position as shown in FIG. 11. The same angular relationship is maintained between the third and fourth stages. Thus, as illustrated in FIG. 11 when upper stage impeller 152 first seals the volume 0 from the connecting passage 140 lower stage impeller 132 is just about to expose volume P to the passage 140 and to the volumes N and M. A similar relationship exists between impellers 150 and 134 when the impellers have turned 180° from the positions shown in FIG. 11. Although not illustrated, the relationships just described are alike between the impellers of the third and fourth stages.

In the position of the impellers illustrated in FIG. 11 the transfer of gas from the first stage volume M to the second stage has just been completed. About half of the pressurized gas is captured in volume O for delivery to the second stage outlet; the remaining portion of this gas remains in volume N, passage 140 and volume M. If it is not relieved this pressurized gas pressure would represent a high residual load against which the first stage impellers would have to do work, thereby decreasing the efficiency of the compressors. This disadvantageous result is avoided in the present invention because the angular relationship between impeller 132 and 152 is such that the low pressure volume P is exposed to the residual volumes N, 140 and M just as the gas is captured in volume O. The residual gas therefore expands into volume P and the loading pressure between the impellers of the first stage is reduced significantly.

Continued rotation of the impellers cause gas in volume P to be delivered to the upper stage which is captured between the impeller 150 and the chamber 106 corresponding to volume O of impeller 152 of the previous half cycle. The residual portion of the gas is relieved by expansion into the well volume between impeller 134 and chamber 130 which has just become exposed to volumes between the impellers and the connecting passage 140, corresponding to the exposure of volume P of impeller 132 180° before.

It is to be noted that the working depth and hence the displacement rate of the first stage impeller is greater than that of the second stage impellers. As such the gas in the first stage increases in pressure during the first to second stage transfer process, being a maximum when volumes N and M are minimal as shown in FIG. 11.

Feedback passages 162 function in the manner described in application Ser. No. 742,890 filed July 5, 1968 for Gear Compressors and Expanders, *now Pat. No. 3,531,227* assigned to the assignee of the present invention to smooth out pulsations, reduce noise and augment the shaft work.

Figure 13:
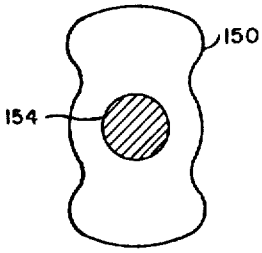
FIG. 13 is a view taken along line 13—13 of FIG. 12.
Figure 14:
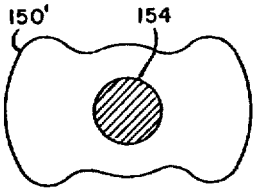
FIG. 14 is a view taken along line 14—14 of FIG. 12.

As illustrated in FIGS. 12 through 14 the second stage impeller 150 is substantially 90° or one half cycle out of phase with the fourth stage impeller 150' on common shaft 154. This relationship is the same for the other impellers on a common shaft. Thus, the vector relation of loads from the first and third stage impellers and the second and fourth stage impellers are at a 90° angle with respect to each other and, as a consequence, the maximum load on the impeller shafts is less than for the case where each impeller is in phase. Additionally, the variation in torsional loading on each shaft is reduced and the torque requirement in the driving and timing gears is made more uniform.

Although preferred embodiments of the present invention have been disclosed and described changes will occur to those skilled in the art. *For example, a reversal in the direction of flow will permit the present apparatus to function as an expander with the mating gears rotating opposite to that for compressor operation.* It is therefore intended that the present invention is to be limited only by the scope of the appended claims.

I claim: [9]

1. A rotary expansible chamber apparatus, comprising:

A. a casing defining first and second working chambers,

B. a first gas passage communicating with each of said working chambers,

C. a second gas passage communicating directly with only said second working chamber, D. a first impeller rotatably mounted in said first working chamber and having two lobes with the space therebetween defining two wells, E. a second impeller rotatably mounted in said second working chamber and having two lobes in mating engagement within the wells of said first impeller, each lobe having a leading edge and a trailing edge, F. said second gas passage and said first and second impellers being so constructed and arranged that the gas occupying the space between said first impeller and said first working chamber is blocked from any prior communication with said second gas passage until the trailing edge of said second impeller exposes said space to said second passage at which time said space has undergone a reduction in volume with a resultant increase in pressure between that existing in said first and second gas passage, G. additional passage means for placing a closed well of said first impeller in communication with a closed well of said second impeller as said second passage is closed whereby the pressure of gas in said wells [in] *is* increased by continued rotation of said impellers.

2. The [compressor] *expansible chamber apparatus* according to claim 1, wherein;

H. said additional passage means are located in a plane spaced from that which contains said second gas passage.

3. The [compressor] *expansible chamber apparatus* according to claim 2, wherein;

I. said additional passage means are defined by peripheral surface portions of said impellers and interior surface portions of said working chambers.

4. The [compressor] *expansible chamber apparatus* according to claim 3, wherein;

J. said peripheral surface portion of one impeller comprises a recess and

K. said second impeller has a peripheral surface portion which is adapted to compliment and project into said recess.

5. The [compressor] *expansible chamber apparatus* according to claim 1, wherein;

H. said additional passage means comprise a conduit in said casing the ends of which communicate with each of said working chambers.

6. The [compressor] *expansible chamber apparatus* according to claim 1, wherein;

H. said additional passage means comprise a conduit the ends of which communicate with each of said working chambers [of] *on* opposite sides of said *second* gas [discharge port] *passage.*

[7. A rotary expansible chamber apparatus, comprising;

A. a casing defining first and second winding chambers

B. a first gas passage communicating with said working chambers,

C. a second gas passage communicating with at least one of said working chambers, D. a first impeller rotatably mounted in said first working chamber and having two lobes with the space therebetween defining two wells, E. a second impeller rotatably mounted in said second working chamber and having two lobes in mating engagement within the wells of said first impeller, F. sealing means rotating in timed relation with at least one of said impellers for cyclically sealing said secong gas passage whereby communication between said second gas passage and said working chambers is at least partially restricted, and G. said sealing means comprises third and fourth coacting two-lobed impellers located, respectively in third and fourth working chambers with which said secong gas passage communicates.]

[8. The expansible chamber apparatus according to claim 7, wherein;

H. said first and second impellers are so synchronized in movement with respect to said third and fourth impellers that substantially half of the gas in one of said first or second impeller wells is captured in one well space between one pair of lobes of said third or fourth impeller, whereas only half of said gas is returned to a well of the other of said first or second impellers.]

[9. The expansible chamber apparatus according to claim 7, wherein;

H. said first and second impellers are mounted on first and second parallel shafts and define with said first and second working chambers a first compressor stage, I. said third and fourth impellers are mounted on third and fourth parallel shafts and define with said third and fourth working chambers a second compressor stage, and there is further provided;

J. a third compressor stage similar to said first compressor stage, and having impellers which are mounted respectively on said first and second shafts, and K. a fourth compressor stage similar to said second compressor stage and having impellers which are mounted respectively on said third and fourth shafts.]

[10. The expansible chamber apparatus according to claim 9, wherein;

L. said first and second impellers are so synchronized in movement with respect to said third and fourth impellers that substantially half of the gas in one of said first or second impeller wells is captured in the well space between one pair of lobes of said third or fourth impeller, whereas only half of said gas is returned to a well of the other of said first or second impellers, and M. wherein the impellers of said third stage are similarly synchronized with respect to the impellers of said fourth stage.]

11. A rotary expansible chamber apparatus comprising;

A. a casing defining first and second working chambers,

B. a gas inlet communicating with said working chambers,

C. a gas discharge port communicating with said first working chamber,

D. a first impeller having lobes and wells therebetween rotatably mounted in said first working chamber, E. a second impeller having lobes and wells therebetween rotatably mounted in said second working chamber in mating engagement with said first impeller, F. said first impeller having a peripheral surface means for cyclically sealing said gas discharge port, and G. passage means for placing a closed well of said first impeller in communication with a closed well of said second impeller as said gas discharge port is closed whereby the pressure of gas in said wells is increased by continued rotation of said impellers.

12. The expansible chamber apparatus according to claim 11, wherein;

H. said passage means are located in a plane spaced from that which contains said gas discharge port.

13. The expansible chamber apparatus according to claim 12, wherein;

I. said passage means are defined by peripheral surface portions of said impellers and interior surface portions of said working chambers.

14. The expansible chamber apparatus according to claim 13, wherein;

J. said peripheral surface portion of one impeller comprises a recess and

K. said second impeller has a peripheral suface portion which is adapted to compliment and project into said recess.

15. The expansible chamber apparatus according to claim 11, wherein;

H. said passage means comprise a conduit in said casing the ends of which communicate with each of said working chambers.

16. A *rotary* expansible chamber apparatus, comprising;

A. a casing defining first and second working chambers,

B. a gas inlet communicating with said working chambers,

C. a gas discharge port communicating with said first working chamber,

D. a first impeller having lobes and wells therebetween rotatably mounted in said first working chamber, E. a second impeller having lobes and wells therebetween rotatably mounted in said second working chamber in mating engagement with said first impeller, F. said first impeller having a peripheral surface means for cyclically sealing said gas discharge port, and G. relief passage means placing the space between said impellers in communication with the adjacent well of said second impeller upon closure of said gas discharge port by said peripheral surface of said first impeller.

17. The rotary expansible chamber apparatus according to claim 16, wherein;

H. said relief passage means comprises a protruding portion of said casing intermediate said gas discharge port and said second working chamber.

18. The rotary expansible chamber apparatus according to claim 16, further comprising;

H. passage means for placing a closed well of said first impeller in communication with a closed well of said second impeller as said gas discharge port is closed whereby the pressure of gas in said wells is increased upon continued rotation of said impellers.

19. The rotary expansible chamber apparatus according to claim 18, wherein;

I. said passage means are located in a plane spaced from that which contains said gas discharge port.

20. The rotary expansible chamber apparatus according to claim 19, wherein;

J. said passage means are defined by peripheral surface portions of said impellers and interior surface portions of said working chambers.

21. The rotary expansible chamber apparatus according to claim 20, wherein;

K. said peripheral surface portion of one impeller comprises a recess and

L. said second impeller has a peripheral surface portion which is adapted to compliment and project into said recess.

22. A rotary expansible chamber apparatus, comprising;

A. a casing defining first and second working chambers having interior walls

B. a gas inlet communicating with said working chambers,

C. a gas discharge port communicating with at least said first working chamber,

D. a first impeller having lobes and wells therebetween rotatably mounted in said first working chamber, said first impeller having at least two different constant cross-sectional profiles only one of which is in the plane of said discharge port, E. a second inpeller having lobes and wells therebetween rotatably mounted in said second working chamber having at least two different constant cross-sectional profiles which compliment and are in mating engagement with respective profiles of said first impeller F. said wells spaced from said interior walls of said working chambers, and G. at least one of said impeller profiles blocking communication between said discharge port and the space between the wells of at least one of said, other profiles and the interior well of its working chamber for a portion of its cycle.

* * * * *